United States Patent [19]

Lohr

[11] 3,711,115
[45] Jan. 16, 1973

[54] PYROTECHNIC GAS GENERATOR
[75] Inventor: Thomas E. Lohr, Warren, Mich.
[73] Assignee: Allied Chemical Corporation, New York, N.Y.
[22] Filed: Nov. 24, 1970
[21] Appl. No.: 92,368

[52] U.S. Cl. ............280/150 AB, 23/281, 102/34.5, 102/37.7, 102/39
[51] Int. Cl. ..........................B60r 21/08, B01j 7/00
[58] Field of Search..280/150 AB; 23/281; 102/34.5, 102/37.7, 39, 40, 58; 9/321

[56] References Cited

UNITED STATES PATENTS

| 3,558,285 | 1/1971 | Ciccone et al. | 102/39 X |
| 3,532,360 | 10/1970 | Leising et al. | 23/281 X |
| 1,313,875 | 8/1919 | Borel | 102/40 |
| 2,195,965 | 4/1940 | Holm | 102/39 |
| 2,869,463 | 1/1959 | McKnight | 102/39 |
| 2,779,281 | 1/1957 | Maurice et al. | 280/150 AB |
| 321,374 | 6/1885 | Lyman | 102/39 |

Primary Examiner—Kenneth H. Betts
Assistant Examiner—John P. Silverstrim
Attorney—Marvin Bressler and Jonathan Plaut

[57] ABSTRACT

A gas generation method and apparatus for use in inflation of vehicle gas bags. A purely pyrotechnic gas generator is provided for inflation of vehicle gas bags in which the sequential ignition of two or more combustion stages provides combustion gases which are directed to a conduit disposed within the generator. A compartment disposed in the generator to remove water contributes additional gas in the form of water vapor to the conduit. A gas bag, in communication with the conduit, is inflated by the gas generated during combustion.

20 Claims, 3 Drawing Figures

PYROTECHNIC GAS GENERATOR

BACKGROUND OF THE DISCLOSURE

The instant invention is directed to a method and apparatus for generating gases to inflate one or more gas bags disposed in a vehicle. More specifically, the instant invention is directed to a method and apparatus for inflating a vehicle gas bag by means of gases generated by a plurality of combustion reactions. Most specifically, the instant invention is directed to a method and apparatus for gas generation in which at least two sequential combustion reactions provide the necessary mass and pressure of gas to inflate a gas bag in communication with a conduit, to which the combustion gases are directed.

The use of inflatable gas bags in vehicles, and more especially automobiles, has been proposed as an alternate means of constraining occupants in the event of impact of the vehicle. The use of gas bags is an alternative to presently employed seat belts. Although seat belts provide excellent protection against serious injury in vehicle impacts and accidents, they suffer from the defect that their use by the occupants of the vehicle is voluntary. Thus, they are often not used. Ample evidence of their non-use is provided by the ever increasing toll of fatalities and serious injuries which occur each year on the nation's roads due to motor vehicle accidents.

In order to insure the protection of the motor driving public it is proposed that, instead of seat belts, an alternate method be employed which does not require any positive act on the part of the occupant. A method and apparatus which meets this requirement is a vehicle gas bag. A vehicle gas bag is actuated upon impact automatically. The vehicle gas bag is instantaneously filled upon impact, constraining the vehicle occupants in their seats during the critical moments following impact.

In the prior art, methods have been proposed for generating gas to inflate gas bags in motor vehicles. Although many methods and apparatus have been suggested, they all require the use of a cylinder of pressurized gas. Although this method can be used successfully to inflate gas bags it suffers from important disadvantages when employed in automobiles and other motor vehicles.

An important disadvantage of a gas cylinder means for filling gas bags is the considerable weight and volume of a typical gas cylinder required to inflate one or more gas bags. A gas cylinder of the type required to inflate a gas bag is quite heavy due to the considerable pressure that must be withstood by the walls of the cylinder. Moreover, the considerable volume of gas required to inflate a gas bag requires the use of a relatively large volume cylinder.

It should be appreciated that increased weight of a vehicle significantly increases the capital and operating cost of the automobile or other motor vehicle. It should be further appreciated that volume in an automobile or other motor vehicle is at a premium.

Another disadvantage of the cylinder type gas generating means is related to safety. The pressure required in a method and apparatus in which a gas cylinder is employed for filling one or more gas bags is high enough to create a serious explosion danger. A high pressure gas cylinder, in the event of a malfunction, can act as a bomb.

It should be apparent from the above, that a method and apparatus which provides the gas necessary to inflate gas bags disposed in motor vehicles, which does not employ a gas cylinder, would be an improvement over the methods and apparatus of the prior art.

SUMMARY OF THE INVENTION

The instant invention is directed to a method and apparatus for generating gas for inflation of gas bags disposed in a motor vehicle without using a stored supply of pressurized gas. In the place of a source of pressurized gas, relatively small sized container means is provided in which a plurality of combustion stages are disposed. Upon impact the first combustion stage is ignited, starting a series of combustion reactions which result in the generation of large volumes of gas. The series of combustion reactions is characterized by the generation of relatively low temperature gases most suitable for inflation of gas bags.

In accordance with the instant invention, a gas generating method and apparatus is provided for inflating at least one gas bag disposed in a motor vehicle. A container means, which is preferably cylindrical, is provided with a first combustion stage disposed along the outer perimeter of the container means. The chamber defining said stage does not extend to the center of the container means, thereby providing a conduit in the center of the container means. The combustible material disposed in the first combustion stage is ignited upon impact by an ignition means producing a first high temperature gas product. A second combustion stage, also disposed in the outer peripheral section of said container means, downstream of and adjacent to said first stage, is ignited by an ignition means disposed in the first combustion stage and in communication with the second stage. This ignition means is designed to ignite the second stage after combustion in the first stage is complete. Thus, a continuous stream of gas to the gas bag, in communication with the conduit, is provided in the period immediately following impact.

Two preferred embodiments for the combustion stage are provided. In the first, each combustion stage comprises two combustion compartments. In the first combustion compartment very hot gases are produced. These gases are directed to a second compartment as part of the flame front resulting from the combustion reaction in the first compartment. The gases from the first compartment are cooled while further combustion gases are produced by the ignition of the combustible material in the second compartment. The gases generated in the second compartment are cooler than the first compartment gas product. The combined gases from the first and second compartments flow into the conduit at a temperature considerably lower than the first compartment gases. This process is repeated in the second and any subsequent combustion stages.

In the second embodiment, each stage comprises a single compartment in which the gas generated flows into the conduit. In this second embodiment, different combustible materials are employed which generate lower temperature gases. As a result, a second compartment for cooling is not required.

A water removal means, disposed in a chamber, and positioned in the outer perimeter of the container means is accommodated adjacent to and downstream of the last combustion stage. The inner boundry of the chamber is shaped to provide a nozzle in the conduit. Water vapor held by the water removal means during storage are liberated into the conduit, to add to the combustion gas stream, by the combination of high temperature of the gas stream and the decreased pressure effect of the combustion gases flowing past the nozzle shaped water removal means chamber.

A vortex generating means is provided downstream of and in communication with the container means conduit. The gaseous stream, generated after impact, flow into the vortex generating means wherein the stream is separated into hot and cold gas streams. The relatively cold gas stream is directed to a cold gas outlet means in communication with a gas bag. The hot gas stream is directed to a hot gas outlet means in communication with an exhaust. The cold gas inflates one or more gas bags.

BRIEF DESCRIPTION OF THE DRAWING

The method and apparatus of the instant invention may be better understood with reference to the accompanying drawings of which:

FIG. 3 is a sectional view of one portion of the gas generator of FIG. 1 illustrating an alternate embodiment.

DETAILED DESCRIPTION

Figure 1:
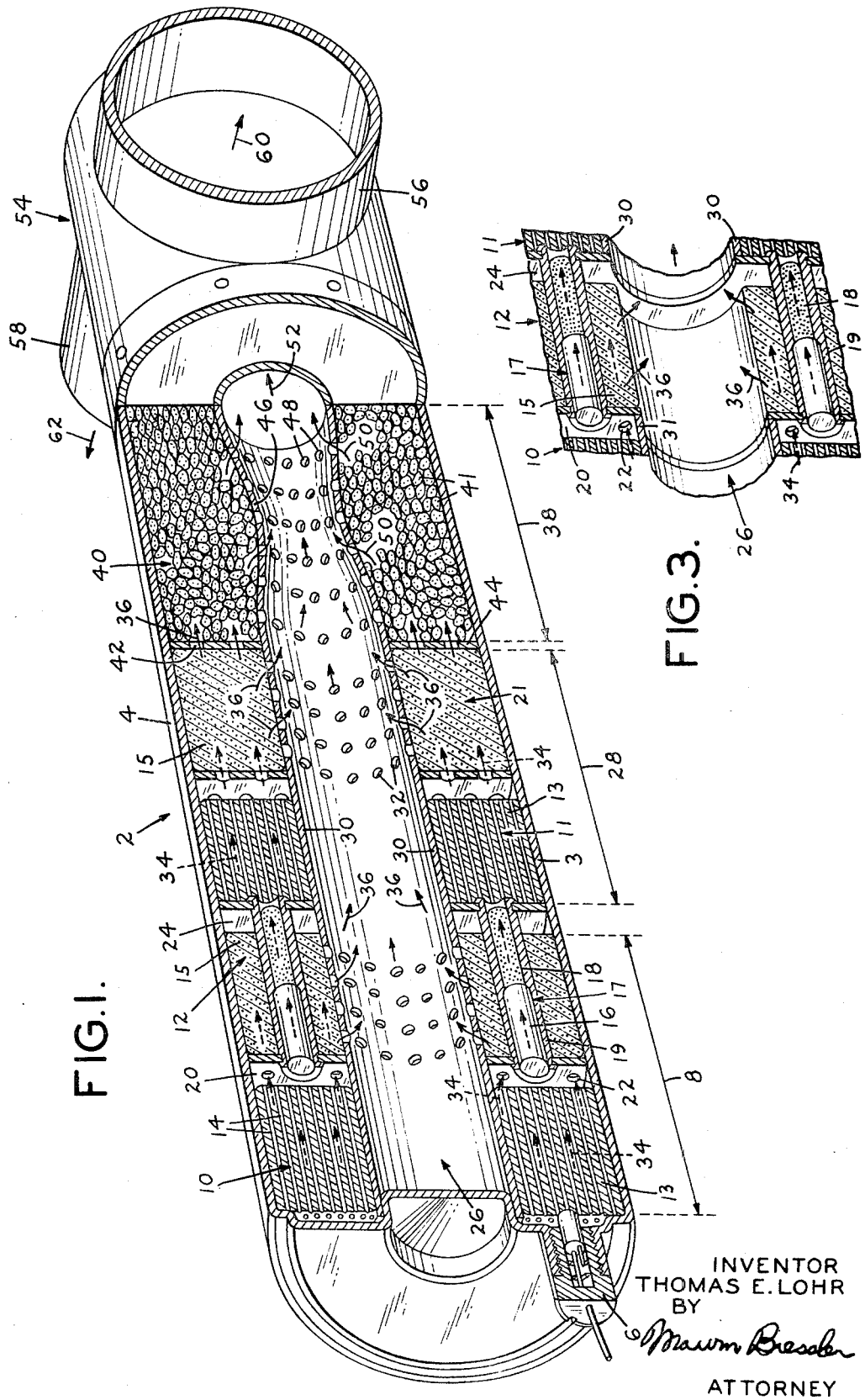
FIG. 1 is a perspective sectional view of a preferred embodiment of the gas generator of the instant invention.

Turning to the drawings in detail, a gas generator is shown in section to expose all the components of the instant invention. As illustrated in FIG. 1, a generator 2 is provided comprising a cylindrical shell 4 having an outer wall 3. Although a cylindrical shaped shell 4 is preferred, it is possible to design the shell into other geometric shapes to conform with space limitations that might arise in a particular vehicle. Thus, a square, rectangular, triangular or other shaped shell might be substituted.

An ignition means 6 is disposed at the upstream end of the gas generator 2. In a preferred embodiment the ignition means 6 comprises a squib, that is, a type of burning powder fuse. Upon impact of the motor vehicle an electrical impulse (not shown) is transmitted to the squib 6 which serves to ignite it.

As illustrated in the drawing, the squib 6 is an appendage to the cylindrical shell 4, disposed at the upstream end thereof. The squib 6 is in communication with a combustion stage 8. As will be described in greater detail below, in the embodiment illustrated in FIG. 1 there are two combustion compartments in each combustion stage, thus, squib 6 or other ignition means is in communication with the upstream or first combustion compartment.

Combustion stage 8 is comprised of a first upstream combustion compartment 10 and a second downstream combustion compartment 12. The stage 8 is disposed in the outer annular section of the cylindrical shell 4. Its outer limit is defined by the shell wall 3. Its inner wall is defined by a separating means 30 which defines a conduit 26. It should be appreciated that even if a different geometrically shaped shell was substituted for the cylindrical shell 4 the first combustion stage 8 would still be defined by a cylindrically shaped inner boundry defining a conduit 26. Of course, the outer boundry would be defined by the shape of the shell.

The first combustion compartment 10 is filled with a combustible material 13. In a preferred embodiment, the material 13 is black powder. A mixture of nitroglycerin and nitrocellulose may alternately be employed. In a third alternative embodiment, the material 13 may be a mixture of rubber and aluminum nitrate. A plurality of small diameter air holes 14 are disposed longitudinally from one end of the material 13 to the other. These holes 14 provide a plurality of air tubes which furnish the oxidizer necessary to support combustion of the combustible material 13 described above. The combustible material 13 is obviously in the form of a solid.

The second combustion compartment 12 is comprised of a second combustible material 15 which, like the combustible material 13 in the first combustion compartment 10, is a solid. In a preferred embodiment, the combustible material 15 is a mixture of ammonium nitrate and carbon. The preferred ratio of ammonium nitrate to carbon is in the range of about 92 percent ammonium nitrate to 8 percent carbon. In another preferred embodiment, the combustible material 15 in the second combustion compartment 12 is ammonium oxylate. Independent of the combustible material 15 used, there is no need for longitudinal air tubes or the like because the spongy solid combustible material 15 contains air to support combustion.

The first and second combustion compartments, 10 and 12 respectively, comprising the first combustion stage 8, are separated by a fire wall 20. Except for communication of the products of combustion in the first compartment 10 into the second compartment 12, the first compartment 10 is totally enclosed by the outer wall 3, an inner wall 31 and a wall 20 separating compartment 10 from compartment 12. It should be appreciated that all these wall boundries are fireproof, as are all the walls of the gas generator 2. Communication between compartments 10 and 12 is provided by a plurality of openings 22 provided in wall 20.

The first combustion stage 8 is further characterized by inclusion of an ignition delay means, generally indicated by reference numeral 17. The ignition delay means 17 has the function of igniting the downstream combustion stage immediately upon completion of combustion in the stage in which it is disposed. In this manner, a continuing uniform stream of gas is provided to the gas bag to keep it inflated for the required period of time immediately following impact. The ignition delay means 17, in a preferred embodiment, is disposed in the second combustion compartment 12 terminating at the downstream end of said compartment, in communication with the downstream stage. From the description which follows, it should be apparent to those skilled in the art that the means 17 may, alternatively, extend all the way into the first compartment 10.

The ignition delay means 17 includes a fireproof tube 19 which separates the ignition delay means 17 from the combustible material 15. A pyrotechnic delay means 16 is disposed within the tube 19. Means 16 comprises, in a preferred embodiment, a primer stick which burns at a predetermined rate measured in inches per millisecond. The primer stick, in one preferred embodiment, comprises a jacketed tube of black powder and ignition decelerators. For ease of construction, it is preferred that tube 19 extends the length of the compartment 12. It would be difficult to formulate a primer stick 16 whose length is fixed by the length of the compartment 12 that would burn at a rate such that ignition of the downstream stage would begin just as ignition of stage 8 is complete. Preferably, the length of the stick is adjusted so that the length selected corresponds to the time required for complete combustion of stage 8. Usually this length is shorter than the length of the compartment 12. The remaining length, between the end of the primer stick 16 and the beginning of the downstream stage, is filled with a rapid burning fuse means 18. In a preferred embodiment, means 18 comprises black powder which burns at a relatively instantaneous speed compared to the primer stick 16. It should be understood that the primer stick of means 16 can never be designed to burn so rapidly that the length of the stick required exceeds the length of the compartment 12. An exception to this rule is the case where the ignition delay means 17 extends into the first combustion compartment 10.

In the preferred embodiment illustrated in the FIG. 1, the second combustion stage is generally indicated at 28. Stage 28 is identical to the first stage 8 in so far as it comprises a first combustion compartment 11 and a second combustion compartment 21. However, the second combustion stage is characterized by certain minor differences.

In the case where there are only two combustion stages, such as the embodiment illustrated in FIG. 1, the second compartment 21 is not provided with an ignition delay means. Since there is no further need to ignite any downstream combustion stages, there is no need for an ignition delay means in the last combustion stage. It should be appreciated that where three or more combustion stages are provided, all but the last stage is provided with these means. Thus, in a three combustion stage embodiment, the second stage is provided with an ignition delay means.

There may, or may not be a second difference between the first stage 8 and the second stage 28. This possible difference is directed to the means separating the combustion stages and center conduit 26. In the embodiment illustrated in FIG. 1, a single fireproof, impervious wall means 30 separate the combustion stages 8 and 28 from the conduit 26, with communication therebetween, to permit passage of the gases generated in stages 8 and 28 into the conduit 26, provided by a plurality of apertures 32 disposed in wall means 30 adjacent the second compartment 12 and 21. In this case, there is no second difference between the first and second combustion stages 8 and 28.

FIG. 3 illustrates an alternate embodiment in which this second difference exists. The second compartment 12 of the first combustion stage 8 in this embodiment is not provided with any wall means between itself and the conduit 26. In certain circumstances, ease of fabrication of this compartment is facilitated by not providing this wall means. Since the gases generated in this compartment communicate with the conduit 26, the same results are accomplished with or without a wall means between the conduit 26 and the compartment 12. In the embodiment illustrated in FIG. 3 a separate wall must, therefore, be provided to prevent the hot gases generated in the first combustion compartment 10 from entering conduit 26. This is provided by wall means 31.

The second combustion stage 28, however, cannot be constructed without a wall means such as that illustrated at 30. This is due to the requirement that the conduit 26 be shaped in the form of a nozzle downstream of the second combustion stage. Structural integrity requires that the section of the conduit 26 be integral with the nozzle shaped wall means. Thus, the second combustion stage 28 differs from the first stage 8 by different communication means with conduit 26.

The above discussion has been directed to a two stage generator. It should be appreciated that in those embodiments in which more than two stages are provided, the first combustion stage is equivalent to all stages upstream of the last downstream stage.

A water removal means, generally indicated at 38 is disposed adjacent to and downstream of the last downstream combustion stage, which in the preferred embodiment, illustrated in FIG. 1, is second combustion stage 28. Means 38 comprises a compartment 40 which is occupied by a water sorbing-hydrate forming material 41. The compartment 40 is separated from the downstream combustion stage 28 by a separating means which in a preferred embodiment is a fireproof wall 44. A limited number of openings 42 are provided in wall 44 to permit flow of a small percentage of the gas generated in the second compartment of the downstream combustion stage into the compartment 40.

The compartment 40 is further defined by the wall means 30 which is provided with a plurality of holes 48, similar to those provided in the wall means 30 adjacent to the second compartment 21 of the second combustion stage 28. Indeed, the wall means 30 separating the conduit 26 from the second combustion stage 28 is the same wall means which separates the water removal means 38 from the center conduit 26. However, wall means 30 adjacent compartment 30 is shaped in the form of a constricting nozzle, as illustrated at 46, providing a venturi opening. This important design consideration will be described in greater detail later.

The material 41 occupying compartment 40 comprises a multiplicity of water sorbing-hydrate forming crystals. In a preferred embodiment, these crystals are alum. Other materials which provide physical and chemical capture and retention of water, by sorbing and hydrate forming means, may be substituted. Alum is merely an excellent example of such a material.

The conduit 26 assumes the same diameter downstream of the nozzle 46, as the diameter in communication with combustion stages upstream of the nozzle opening 46. The conduit 26 is in communication with a vortex generator, generally indicated at 54, at its downstream end. As those skilled in the art understand, a vortex generator separates a gas stream into separate hot and cold gaseous streams. The vortex generator 54 of the instant invention is provided with a cold gas outlet 56 and a hot gas outlet 58. The cold gas outlet 56 is in communication (not shown) with the diffuser about which a gas bag is disposed. The hot gas outlet 58 is in communication (not shown) with an exhaust.

Figure 2:
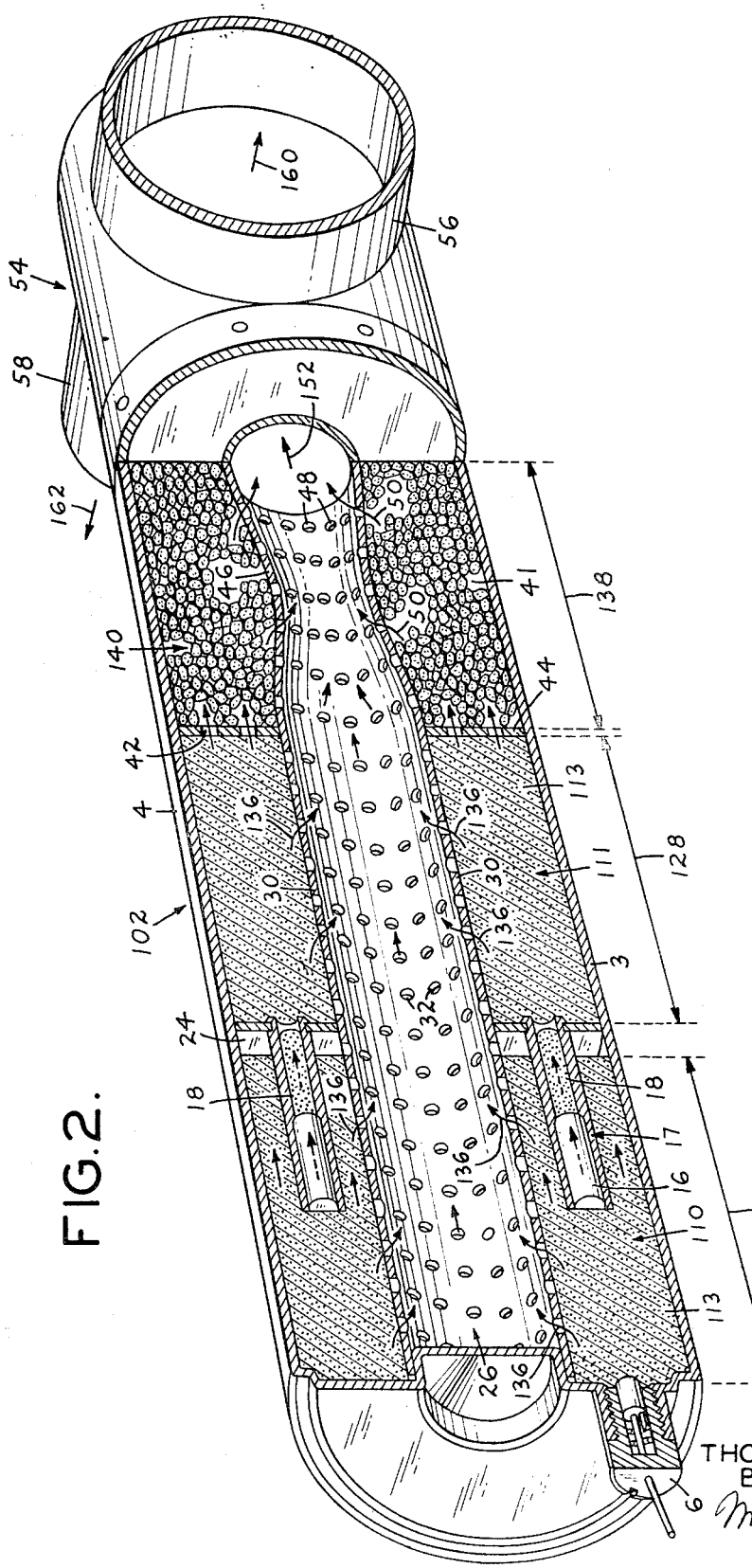
FIG. 2 is a perspective sectional view of another preferred embodiment of the gas generator of the instant invention.

Another preferred embodiment of the gas bag inflation method and apparatus of the instant invention is shown in FIG. 2. The gas generator 102 depicted in FIG. 2 differs, principally, from generator 2 in that each combustion stage comprises a single compartment rather than the two compartment combustion stages of generator 2. Thus, the first combustion stage 108 of the generator 102 comprises a single compartment 110 filled with a combustible material 113. The material 113 is a combustible spongy-like solid mass in which pockets of air are trapped. Upon combustion, the gas generated is sufficiently cool to be immediately directed into the conduit 26, in communication with the gas bag.

In FIG. 2, communication between the stage 108 and the conduit 26 is provided by a plurality of openings 32 disposed in the wall means 30. It should be appreciated that an arrangement of the type illustrated in FIG. 3 for communication between combustion stage 108 and conduit 26 may be substituted.

Again, the first stage 108 is provided with ignition delay means 17. As depicted in FIG. 2, the means 17 is disposed downstream of the upstream end of the stage 108, extending to the upstream end of the second stage 128. It should be appreciated that this position is a matter of convenience of design. In an alternate embodiment (not shown) the ignition delay means may extend the length of the stage 108.

Gas generator 102 comprises two combustion stages, so that the second stage 128, is the last downstream stage. For this reason, combustion stage 128 is not provided with an ignition delay means. In every other respect, however, the second stage 128 is exactly the same as the first stage 108. The stage 128 includes a single compartment 111 filled with the same combustible material 113 as contained in the first stage 108. Since, most of the other features of the gas generator 102 are the same as generator 2, the reference numerals for those structural features, which are the same as those in gas generator 2, have not been changed.

Considering now the operation of the gas generator of the instant invention, the gas generators 2 and 102 are operative as soon as they are installed in the vehicle. The alum or other water removing material 41, disposed in the water removal means 38 or 138, immediately begins to sorb mechanically and combining chemically with moisture present in the atmosphere surrounding the gas generator. Thus, the water removal means insures complete combustion of the combustion stages of the gas generator by removing moisture from the atmosphere surrounding the generator. This prevents dampening of the combustible materials disposed in the combustion stages and thereby insures complete combustion. Complete combustion of the combustibles is required in order to insure the generation of an adequate mass of gas for gas bag inflation. The water removing material 41 is not, as would be initially assumed, charged into the compartment 40 or 140 in the totally anhydrous stage. Instead, the material 41 is somewhat hydrated. This insures generation of enough water vapor, into the gaseous stream, to sufficiently cool the gas stream, in the event of an impact of the vehicle soon after installation and before the means 38 or 138 has enough time to remove much moisture.

Turning now to the method of gas generation to inflate a gas bag in the event of an impact of the vehicle reference is again made to FIG. 1. Upon impact, an electrical signal (not shown) is transmitted to the squib 6 to ignite it. This fast burning fuselike device, in turn, ignites the first combustible material 13 contained in the compartment 10. As stated above, the material 13 is preferably black powder, which is combination of potassium nitrate, sulfur and carbon. In another preferred embodiment, the material is a mixture of nitroglycerin and nitrocellulose, which is known to those skilled in the art as a double base explosive. Both of these combustible solid mixtures generate large volumes of gas. Moreover, they both generate gases of the type that have no deleterious effect on the gas bag nor on human beings. That is, the gases generated are not corrosive to the gas bag material, nor are they toxic to humans. The disadvantage of these materials lie in the high temperature of the gases generated during combustion. The resultant temperature of the product gases are in the range of approximately 3,200° F. Obviously, temperatures this high would burn a gas bag.

In order to retain the advantages of these materials a method of cooling these gases must be employed. To accomplish cooling, the combustion stages are provided with a second combustion compartment, illustrated in FIG. 1 by the compartments 12 and 21. Compartments 12 and 21 are filled with a combustible material 15. Material 15 is characterized by its ability to cool hot gases and at the same time to generate large volumes of gas upon ignition. An excellent material to attain these purposes, in a preferred embodiment, is the mixture of ammonium nitrate and carbon mentioned previously. The material 15 is mixed with air into a spongylike solid. Unlike the material 13, which is provided with a plurality of cylindrical air tubes 14, no such feature is necessary to support combustion in the second combustion compartment 12.

After ignition of the squib 6, ignition of the combustible material 13 begins. Combustion in the compartment 10 is characterized by the generation of a flame front accompanied by the corresponding generation of large volumes of combustion gas. These combustion products are directed into the second combustion compartment 12, by means of a plurality of openings 22 disposed in the wall 20, which separates the two compartments. The downstream movement of the flame and gases is indicated by the dotted arrows 34. The hot gases generated by material 13 are cooled by the material 15, thus, lowering its pressure. This pressure reduction and consequent mass reduction is more than made up for by the ignition of the material 15 by the flame front, which enters compartment 12 through openings 22 with the hot gases. The combustion of material 15 produces more gas than is lost by cooling of the first compartment combustion gases.

It should be appreciated that the gases generated by combustion of the material 15 are also non-toxic to humans and do not have a deleterious effect upon the gas bag material. The combined gases, that is, the cooled gases from the first combustion compartment 10 and the gases generated by the combustion of the material 15 have only one place to go, the conduit 26. The gases go into the conduit 26 as indicated by the solid arrows 36 in FIGS. 1 and 3. These alternate methods of communication were previously described. The generated gas stream, symbolically illustrated as arrows 36, is a gas mixture of the two combustion reaction products and is at a temperature in the range of about 300° F. to 700° F. and preferably about 500°F.

Disposed in the axial center of the compartment 12 is the ignition delay means 17. The pyrotechnic delay primer stick of the delay means 16 is in communication with the flame front generated by the combustion of material 13. The stick 16 is ignited and burns at a slow predetermined rate so that ignition of material 13 contained within the first compartment 11 of the second combustion stage 28 does not begin until the combustion reaction in compartment 12 is complete and all the gases generated in the first combustion stage 8 have entered the conduit 26. The resultant sequential generation of gas by stages results in a continuing supply of gas, at the proper thermodynamic conditions, to insure inflation of the gas bag for a sufficiently long period of time following impact. In the absence of the ignition delay means 17, standard means ignition would result in ignition of the second combustion stage 28 while combustion of the first stage 8 is incomplete. This would result not only in generation of more gas than is necessary, but more importantly, would provide inflation for an insufficient period of time following impact. It is obvious that the ignition delay means 17 also provides an excellent means for communicating ignition to the second combustion stage 28, while maintaining the second combustion stage in fireproof isolation from the remainder of the gas generator 2.

Since the second combustion stage 28 is a carbon copy of the first combustion stage 8, except for the ignition delay means 17, the same combustion reactions occurs with the same resultant generation of gases 36 that exit from the second compartment 21 of the second combustion stage 28 into the conduit 26 through openings 32.

It should be appreciated that if there are three or more stages, the second combustion stage would be provided with ignition delay means, and hence would be exactly the same as first combustion stage 8.

The gases denoted as 36 flow through conduit 26 at a constant velocity until they are constricted by means of the configuration of the wall means 30 defining the inner perimeter of the compartment 40. This configuration which forms a venturi nozzle 46 causes the velocity of the gases to increase. As those skilled in the art are aware, this also results in a decrease in pressure at the point of increased velocity. The resultant decrease in pressure in the compartment 40 results in the breaking of hydrates formed by the material 41. As those skilled in the art know, the water of hydration in a hydrate can be liberated upon decrease in equilibrium pressure. Moreover, water sorbed on the surface of the material 41 is desorbed as the pressure is decreased. Thus, water vapor mechanically held on the surface of the particles 41 are also liberated.

In addition to the desorbing and dehydrating effect of reduced pressures, a limited number of holes 42 disposed in the fireproof wall 44, separating the second combustion stage 28, or downstream stage in the case of a gas generator having more than two stages, and the water removal means 38, provide the means for a small percentage of the gas generated in compartment 21 to flow into the water removal means compartment 40. This gas flow is indicated by the arrows 37. The gas 37 heats the particles 41. Of course, the gas flowing through the nozzle 46 also indirectly heat the particles 41. The effect of temperature increase on desorption and dehydration is the same as that of reduced pressure. Thus, the combined effect of increased temperature and decreased pressure is the liberation of most of the water held by the water removal means 38. The water in the form of water vapor, indicated in FIG. 1 by the arrows 50, flow into the conduit 26 by means of a plurality of openings 48 disposed in on that portion of the wall means 30 separating the water removal means 38 from the conduit 26.

It should be understood that the liberated water vapor 50 is at a lower temperature than the generated gas 36 flowing in the conduit 26. This temperature gradient permits transfer of heat from the gas 36 to the water vapor 50. This results in a significant temperature decrease in the gas stream 36. This is due to the high heat capacity of water vapor which permits large amounts of heat energy to be absorbed by the water vapor. Thus, the temperature increase of the water vapor 50 is not nearly as great as the temperature loss of generated combustion gases 36.

The combined gaseous stream, denoted at 52, comprising the generated gas 36 and the liberated water vapor 50, flows into the vortex generator 54. The vortex generator 54 separates the gas stream into hot and cold gas streams denoted respectively at 62 and 60. The purpose of this separation is to further cool the gas 60 that is employed to inflate the gas bag.

The cool gas stream 60 is directed by the cold outlet means 56 towards a diffuser, to which it is in communication. A gas bag disposed about the diffuser is inflated with this stream. The hot gas stream 52 is exhausted by way of the hot outlet means 58.

Turning again to FIG. 2, the operation of the preferred embodiment in which a single compartment constitutes a combustion stage is similar to the two compartment stage operation. It differs from the two compartment stage embodiment in that generated gas flows into the center conduit 26 through compartments 110 and 111 rather than from only a portion of the stages 8 and 28 of generator 2, namely compartments 12 and 15. Thus, generated gas 136 flows into conduit 26 by means of a plurality of openings 32 disposed in wall means 30 throughout the length of compartments 110 and 111. Alternatively, flow into conduit 26 may be provided by an arrangement similar to that depicted in FIG. 2, wherein compartment 110 is not separated from conduit 26 by any wall means.

This arrangement, in which gas generated from a single combustion compartment flows into conduit 26, in communication with a gas bag, is made possible by the combustible material 113 disposed in compartments 110 and 111. The material 113 is solid, but foamy to the extent that a multiplicity of air holes are provided to support combustion. The combustion of material 113 results in the generation of gas 136 at a relatively low temperature, in the range of about 300° F. to 700° F. Typical of combustible materials which provide suitable inflating gas in this temperature range are the mixture of rubber and ammonium nitrate, and the mixture of polyvinyl chloride and ammonium oxylate. In preferred embodiments one of these mixtures is employed.

The method described previously for gas generation by the generator 2 applies to generator 102 except for difference described above. It should be noted that gas 152, which fills the gas bags, is denoted by a new reference numeral to distinguish the different chemical nature of the combustion gas constituent of the generated gas stream.

It should be appreciated that the above-described preferred embodiments of the method and apparatus of the instant invention are meant to be illustrative only. The foregoing specification and drawings will make apparent various modifications which are within the contemplation of the instant invention. Therefore, the scope of the instant invention should be limited only by the appended claims.

What is claimed is:

1. An apparatus for inflation of a gas bag disposed in a vehicle comprising:
   a. a container means provided within with conduit means;
   b. a first combustion stage disposed in the upstream end of said container means and in gas flow communication with said conduit means;
   c. an ignition means connected to the upstream end of said first combustion stage to ignite said first stage upon impact of said vehicle;
   d. a second combustion stage disposed adjacent to and downstream of said first combustion stage and in gas flow communication with said conduit means;
   e. an ignition delay means disposed within said first combustion stage in communication with said second combustion stage, for ignition of said second stage after combustion and generation of gas in said first stage is completed;
   f. a moisture absorbing means disposed downstream of said second combustion stage, means for liberating water vapor from said moisture absorbing means, into said conduit means during combustion
   g. said conduit means having an outlet means disposed downstream of said moisture absorbing means, in gas flow communication with said gas bag, whereby combustion gases generated in said combustion stages and water vapor liberated from said moisture absorbing means flow into said gas bag through said conduit means.

2. An apparatus in accordance with claim 1 including vortex generator means disposed between the downstream end of said conduit means and said outlet means whereby a cool gas stream generated in said vortex generator means is directed into said outlet means.

3. An apparatus in accordance with claim 1 wherein said first and said second combustion stages are disposed in the peripheral section of said container means in communication with said conduit means for communication of the gas generated in said stages with said gas bag.

4. An apparatus in accordance with claim 1 wherein said conduit means comprises a cylindrical opening in said container means provided with a venturi nozzle, defined by said inner boundry of said moisture absorbing means.

5. An apparatus in accordance with claim 1 wherein said container means comprises a cylindrical shell.

6. An apparatus in accordance with claim 1 wherein said moisture absorbing means comprises a multiplicity of hydrate forming, water sorbing crystals encased in a compartment whereby said combustion stages are maintained free of moisture prior to the ignition of said generator.

7. A gas generator in accordance with claim 1 wherein said ignition means comprises a squib.

8. A gas generator in accordance with claim 1 wherein said ignition delay means comprises an enclosed solid mixture of gun powder and decelerators.

9. A gas generator in accordance with claim 1 wherein said first and second combustion stages each comprise a solid combustible material disposed in a single enclosed compartment in communication with said conduit means.

10. A gas generator in accordance with claim 9 wherein said combustible material is a solid mixture of rubber and ammonium nitrate.

11. A gas generator in accordance with claim 9 wherein said combustible material is a solid mixture of polyvinyl chloride and ammonium oxylate.

12. A gas generator for inflation of a gas bag disposed in a vehicle comprising:
   a. a container means provided within with conduit means in gas flow communication with said gas bag;
   b. a first combustion stage for generating gas in said container including separated first and second compartments in gas flow communication with said conduit means;
   c. an ignition means connected to said first compartment of said first combustion to ignite said first combustion stage upon impact of said vehicle;
   d. a second combustion stage for generating gas in gas flow communication with said conduit means, comprising separated first and second compartments disposed adjacent to and downstream of said first combustion stage;
   e. an ignition delay means disposed within said second compartment of said first combustion stage for ignition of said first compartment of said second combustion stage after combustion of said first combustion stage is completed;
   f. a water removal means through which at least a portion of said generated gas flows disposed downstream of and adjacent to said second combustion stage, said water removal means in gas flow communication with said conduit means through aperture means in said conduit means and characterized by an inner boundry defining a nozzle means in said conduit means; and
   g. an outlet means adjacent to and connected to said conduit means and said gas bag, whereby combustion gases generated in said first and second combustion stages and water vapor liberated from said water removal means during ignition of said combustion stages flow into said gas bag.

13. A gas generator in accordance with claim 7 including vortex generator means disposed between the downstream end of said conduit means and said outlet means, whereby a cool gas stream generated in said vortex generator means is directed into said outlet means.

14. A gas generator in accordance with claim 12 wherein said second compartment of said first and second compartments comprises a solid combustible material contained within wall means in communication with said conduit means and said first compartment.

15. A gas generator in accordance with claim 14 wherein said combustible material is a solid mixture of ammonium nitrate and carbon.

16. A gas generator in accordance with claim 12 wherein said first compartment of said first and second combustion stages comprises a solid combustible material provided with cylindrical air tubes, contained within wall means separating said first compartment from said conduit means and said second compartment, said wall means, separating said first and second compartments, provided with a plurality of openings for communication between said first and said second compartments.

17. A gas generator in accordance with claim 16 wherein said combustible material is black powder.

18. A gas generator in accordance with claim 16 wherein said combustible material is a mixture of rubber and aluminum nitrate.

19. A method for generation of gas for inflation of a gas bag in a vehicle comprising the steps of:
   a. igniting a first combustion stage of a gas generator upon impact of said vehicle whereby combustion gases are generated into a conduit in communication with said gas bag;
   b. igniting a second combustion stage after combustion and generation of gases in said first combustion stages is completed, whereby combustion gases continue to flow into said conduit;
   c. liberating water vapor stored in said generator downstream of said second stage said water vapor being liberated by passing at least a portion of said generated gas through a hydrated material and by decreasing the equilibrium pressure of said hydrated material; and
   d. inflating a gas bag in communication with said conduit by a combined stream comprising said combustion gases and said water vapor.

20. A method in accordance with claim 19 including the step of separating said combined stream into a hot and a cool stream upstream of said gas bag whereby only the cool stream is used to inflate said gas bag.

* * * * *